United States Patent [19]

Caronia et al.

[11] Patent Number: 5,028,330
[45] Date of Patent: Jul. 2, 1991

[54] FILTER & PROCESS FOR MANUFACTURING FILTERS USING MATERIAL CURED BY ULTRAVIOLET RADIATION FOR END CAPS

[75] Inventors: Anthony J. Caronia, East Greenwich; Kevin J. Rucinski, Coventry; Edmond H. Cote, Jr., Warren; Robert Gabrielson, North Smithfield; Alan B. Johnson, Attleboro; Lawrence A. Ruddy, Pawtucket, all of R.I.

[73] Assignee: Allied-Signal Inc., Morristown, N.J.

[21] Appl. No.: 364,777

[22] Filed: Jun. 12, 1989

[51] Int. Cl.$^5$ .............................. B01D 27/06
[52] U.S. Cl. ....................... 210/493.2; 55/498; 55/499; 55/DIG. 5; 210/497.01; 156/275.5
[58] Field of Search .................. 55/497–499, 55/521; 156/275.5, 275.7; 210/493.1, 493.2, 497.01

[56] References Cited

U.S. PATENT DOCUMENTS

| 2,771,156 | 11/1956 | Kasten et al. | 210/493.2 X |
|---|---|---|---|
| 2,919,765 | 1/1960 | Kasten | 55/498 X |
| 2,941,620 | 6/1960 | Thornburgh | 55/498 |
| 2,962,121 | 11/1960 | Wilber | 210/493.1 X |
| 3,467,256 | 9/1969 | Humbert, Jr. et al. | 210/493.1 X |
| 3,589,108 | 6/1971 | Dingel et al. | 55/498 X |
| 4,028,204 | 5/1977 | Rosen et al. | 156/275.7 X |
| 4,070,398 | 1/1978 | Lu | 156/275.5 X |
| 4,104,170 | 8/1978 | Nedza | 210/493.2 X |
| 4,130,487 | 12/1978 | Hunter et al. | 55/521 X |
| 4,304,580 | 12/1981 | Gehl et al. | 55/498 X |
| 4,349,363 | 9/1982 | Patel et al. | 55/498 |
| 4,419,241 | 12/1983 | Hoffmann . | |
| 4,422,861 | 12/1983 | Dusza | 55/521 Z |
| 4,512,892 | 4/1985 | Ganzi et al. | 210/493.2 |
| 4,521,309 | 6/1985 | Pall | 210/493.2 |
| 4,559,138 | 12/1985 | Harms, III | 210/4973.01 X |
| 4,561,979 | 12/1985 | Harms et al. | 210/497.01 X |
| 4,568,405 | 2/1986 | Lin | 156/275.7 X |
| 4,605,465 | 8/1986 | Morgan | 525/305 X |
| 4,608,166 | 8/1986 | Cain | 210/232 |
| 4,626,307 | 12/1986 | Cherkas et al. | 55/498 X |
| 4,634,527 | 1/1987 | Marshall | 55/498 X |
| 4,639,261 | 1/1987 | Pittman et al. | 55/521 X |
| 4,643,785 | 2/1987 | Paynton | 156/275.5 X |
| 4,717,605 | 1/1988 | Urban et al. | 156/275.7 X |
| 4,720,292 | 1/1988 | Engel et al. | 55/498 X |
| 4,753,704 | 6/1988 | Stewart | 156/275.5 |
| 4,822,434 | 4/1989 | Sawaki et al. | 156/275.5 X |
| 4,826,597 | 5/1989 | Silverwater et al. | 55/498 X |
| 4,861,479 | 8/1989 | Solzer | 55/498 X |
| 4,878,930 | 11/1989 | Manniso et al. | 55/498 X |
| 4,921,600 | 5/1990 | Meissner | 210/493.1 X |

FOREIGN PATENT DOCUMENTS

| 0213930 | 3/1987 | European Pat. Off. . | |
| 3429634 | 2/1986 | Fed. Rep. of Germany . | |
| 2119674 | 11/1983 | United Kingdom | 55/498 |

Primary Examiner—Robert Spitzer
Attorney, Agent, or Firm—Ken C. Decker; William N. Antonis

[57] ABSTRACT

The end caps of a filter element are formed on the element by dispensing a photo-initiated polymer in a transparent mold, setting the end of the filter media array in the mold, exposing the mold to ultraviolet light for a time sufficient to cure the polymer, and then stripping the mold from the finished end cap. Accordingly, the time of 60–75 seconds required to cure prior art Plastisol end caps is reduced to a few seconds necessary to cure the end caps made from the photo-initiated polymer. The end caps have been designed with reinforcing ribs to minimize the amount of polymer required while still maintaining necessary hoop strength to retain the media in place.

15 Claims, 4 Drawing Sheets 5,028,330

FILTER & PROCESS FOR MANUFACTURING FILTERS USING MATERIAL CURED BY ULTRAVIOLET RADIATION FOR END CAPS

This invention relates to filters and methods for manufacturing filters.

Filters have been used with internal combustion engines for many years. For example, liquid filters for filtering the engine lubricating oil and for filtering gasoline, and air filters for filtering the engine combustion air, are necessary for proper operation of internal combustion engines. Conventional filters of this type consist of a pleated paper filtering media, which is arranged in a circumferentially extending array formed into a cylinder with the pleats tapering in a generally radial direction between outer tips and inner tips. A perforated centertube, which is commonly made of metal, circumscribes the inner tips of the pleats and prevents radial collapse of the latter. The upper and lower edges of the pleats which define the ends of the array must be sealed to prevent fluid bypass of the filter. Prior art filters use a compound known commercially as Plastisol to seal the ends of the pleats. The Plastisol compound is dispensed in end caps (which may be made from either metal or paper) and the ends of the array are inserted in the end caps. The Plastisol is then cured by heat. During the curing process, noxious fumes are driven off, which must be properly disposed of. Furthermore, the curing process requires 10-75 seconds, which is the limiting factor in increasing line speeds for filter manufacture. The end caps used on liquid filters are often left in place even after curing is complete, even though these end caps serve no function other than as a carrier for the Plastisol, since the expense involved in stripping the end caps is greater than the cost of the end caps themselves.

The present invention uses a photo-initiated polymer to replace the Plastisol used in prior art filters. The photo-initiated polymer is cured in a few seconds by exposure to an ultraviolet light source. Since the compound consists of 100% solids, no fumes are driven off during the curing process. Photo-initiated polymers are readily available commercially from several sources.

Since the photo-initiated polymer cures in only a few seconds, use of this compound to replace the Plastisol compound used in existing manufacturing permits line speeds to be substantially increased, thereby substantially reducing the cost of the filter. Furthermore, since no noxious fumes are driven off during curing, the expensive equipment needed to dispose of such fumes is not necessary. Also, the molded end concept allows the filter of the present invention to include end caps which are designed to require the minimum amount of compound, while still maintaining acceptable hoop strength to prevent collapse of the pleats.

These and other advantages of the present invention will become apparent from the following description, with reference to the accompanying drawings, in which.

Figure 1:
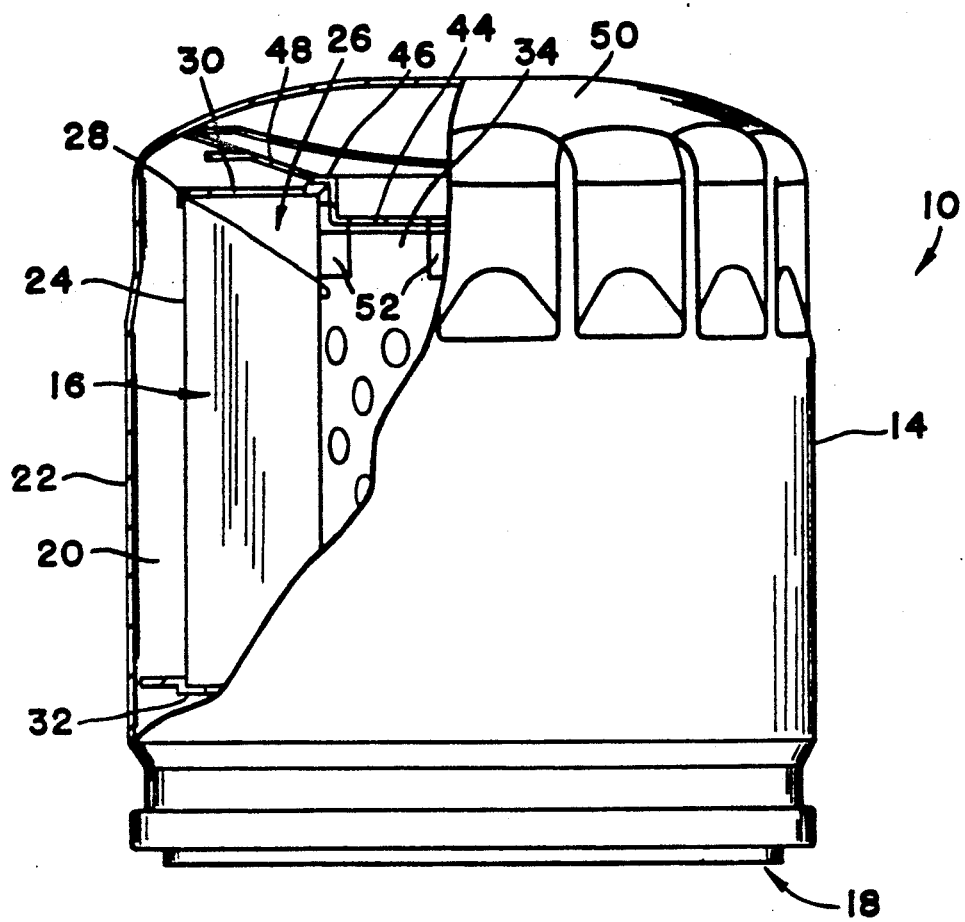
FIG. 1 is a view of a filter, partly in section, made pursuant to the teachings of the present invention.
Figure 2:
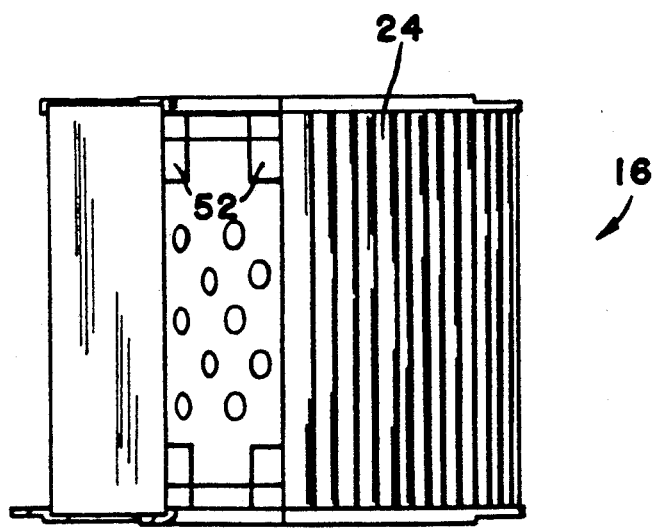
FIG. 2 is a view, partly in section, of the filter cartridge used in the filter of FIG. 1.

Referring now to FIGS. 1-4 of the drawings, a filter assembly generally indicated by the numeral 10 includes a metal housing 14 which receives a filter cartridge generally indicated by the numeral 16. The filter cartridge 16 is illustrated in detail in FIG. 2. The filter 10 is a liquid filter for filtrating the lubricating oil of an internal combustion engine, and is provided with an engagement surface 18 on the end thereof for mounting on the conventional mounting surface (not shown) of the vehicle engine. The oil to be filtered is communicated through openings (not shown) carried on the engagement surface or mounting base 18. Fluid to be filtered is communicated into chamber 20 defined between circumferentially extending wall 22 of the housing 14 and the outer tips 24 of a conventional pleated paper filtering medium 26. The filtering media 26 consists of a circumferentially extending array of pleats tapering radially between outer tips 24 thereof and inner tips 28. The array is formed into a cylinder, and includes an upper end cap 30 which seals the upper ends of the pleats defining the cylinder formed by the media 26 and a lower end cap 32 which seals the lower ends of the pleats defining the cylinder comprising the media 26. A perforated centertube 34 circumscribes the inner circumferential surface of the media 26 defined by the tips 28 to provide support of the media 26 against collapse of the pleats. Although centertubes 34 are commonly used in filters, there are not always necessary.

Figure 3:
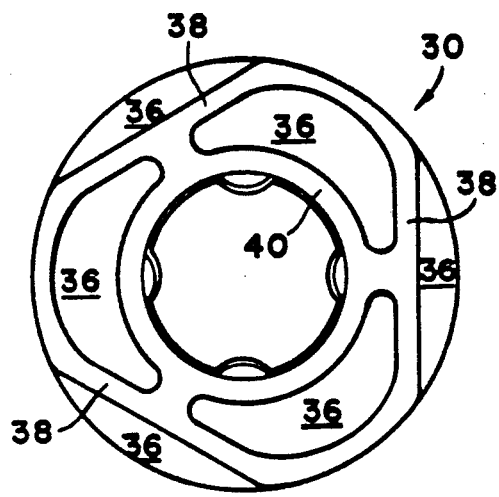
FIGS. 3 and 4 are plan views, respectively, of the top and bottom of the subassembly illustrated in FIG. 2.
Figure 4:
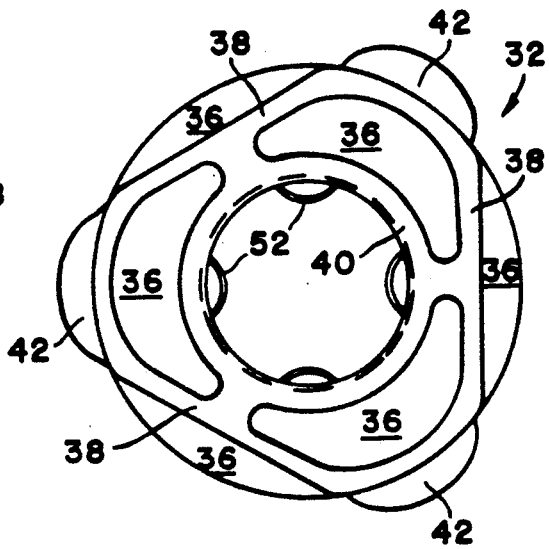

Referring now to FIGS. 3 and 4, each of the end caps 30, 32 include areas of reduced thickness 36 and thickened areas defining ribs 38, 40. The rib 40 extends circumferentially around the end cap and projects radially to extend across the end of the centertube 34 and a portion of the corresponding ends of the pleats comprising the media 26. Reinforcing ribs 38 extend chordally across the ends of the corresponding pleats. The reinforcing ribs 38, 40 cooperate to increase the hoop strength of the end cap while permitting the intervening portions 36 to be of reduced thickness, thereby minimizing the amount of the material necessary to manufacture the end caps 30, 32. The end cap 32 includes circumferentially spaced, radially projecting tabs 42 which project beyond the circumference defined by the outer tips 38 of the media 26 to engage the wall 22 of the housing, to thereby center the array of filtering media 26 within the housing 14.

The upper end (viewing FIG. 1) of the centertube 34 is closed by a centertube cap 44. The centertube 44 includes a surface 46 which seals against the circumferentially extending rib 40. A leaf spring 48 engages the end cap 44 and extends across the end cap 30 to engage end wall 50 of the housing 14, which closes one end of circumferentially wall 22. Centertube 34 includes circumferentially spaced, radially inwardly extending projections 52 engaging the centertube cap 44 to permit the spring means 48 to urge the centertube cap 44 against the projections to thereby relieve the rib 40 of end cap 30 of some of the force that would otherwise exerted by the leaf spring 48, to thereby prevent a "cookie cutter"

effect of the end of the centertube 34 cutting through the rib 40. Similar projections are provided at the opposite end of the centertube 34, but these projections serve no purpose, other than permitting the centertube to be installed in the cartridge 16 without regard of which end of the centertube is placed adjacent the end cap 30 and centertube cap 44.

Referring now to FIGS. 5-8, the method of installing end caps 30, 32 on the cartridge 16 will now be described in detail. A three dial indexing dial machine illustrated generally at 52 includes a pair of mold dials 54, 56 which are indexed in the direction of the arrows. Each of the openings in mold dials 54, 56 receives a transparent, glass mold 58. As can best be seen in FIG. 8, the upper surface (viewing FIG. 8) of the mold 58 is contoured at 60 in the shape of the upper end cap 30 and has a corresponding contouring 62 on opposite surface thereof which corresponds to the lower end cap 32. Although opposite sides of the transparent glass molds 58 are contoured respectively for the upper and lower end caps 30, 32, the molds 58 are installed on the dials 54 and 56 so that alternate molds installed in stations 54A-54H of dial 54 and 56A-56H of dial 56 are inverted; that is, alternate molds will be installed on the stations of the dials 54, 56 with the surface 60 facing upwardly, and the other molds will be installed with the surface 62 facing upwardly. As will be seen, the molds are never inverted during normal operation of the machine.

As will be seen, it is important that the mold 58 be manufactured of glass or some other transparent material, since an important feature of the invention is that the material from which the end caps 30, 32 are made is a photo-initiated polymer. This type of polymer is initially in a liquid or semi-liquid state, but responds to ultraviolet light to cure (within a time period of a few seconds) into a solid, sealing state. The station 54H of mold dial 54 is equipped with an ultraviolet light 59 indicated by the dashed lines, which is immediately below the station 54H. Similarly, mold dial 56 is provided with a source of ultraviolet light 61, which is immediately below the station 56H.

Figure 8:
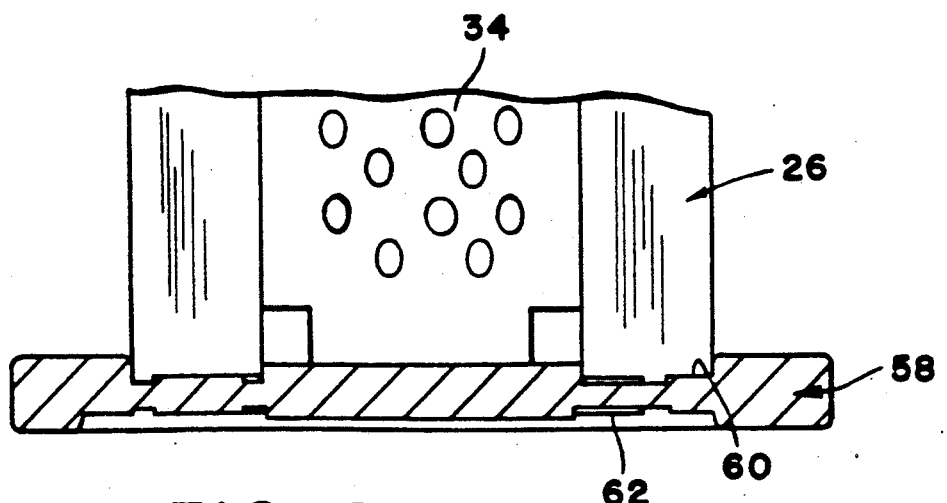
FIG. 8 is a fragmentary cross-sectional view of the filter array illustrated in FIG. 2 placed upon the mold forming the end caps for the array.

Dial machine 52 further includes indexing dial 63 from which arms 64A-64H extend. Dial 63 is indexed in the direction indicated by the arrow. Fixtures indicated schematically at 66 are mounted on each of the arms 64A-64H. The fixtures 66, include clamshell grippers 68 and a mold supporting arm capable of picking up, kicking off, raising and lowering the molds 58 as will be hereinafter described. Each of the fixtures 66 also include clamshell grippers, each of which comprises a pair of grasping arms 70, 72. Referring to FIG. 8, upon actuation by engagement of the roller 74 with an appropriate cam, the arms 70, 72 may be spread apart to grasp filter cartridge 16 or to release a filter cartridge 16. Each of the fixtures 66 includes a mold supporting arm 76 which supports one of the molds 58. The mold supporting arm 76 is mounted on a spindle 78 for vertical movement in response to engagement with an appropriate cam or other operator (not shown), to either raise or lower the mold 58 with respect to the grippers 68. Fixture 66 can move back and forth along the axis of the arm 64 a small amount to permit the mold supporting arm 76 to be moved underneath one of the molds 58 located on the dials 54 or 56. Clamshell grippers 68 are mounted on a spindle 78. Upon release of the mechanism 80 by appropriate cam or other operator, the gripper 70 can be rotated about the axis of the spindle 78 by another cam or other operator. The various cams or other operators necessary to actuate the various functions of the fixture 66, and the necessary tooling for indexing the dials 54, 56, and 62 are well known to those skilled in the art and will not be described herein. Unfinished cartridges 16 are fed to the dial 63 at station 64A thereof and finished cartridges with the end caps 30, 32 installed are kicked off the dial 63 at station 64G thereof, as indicated in FIG. 6.

Figure 5:
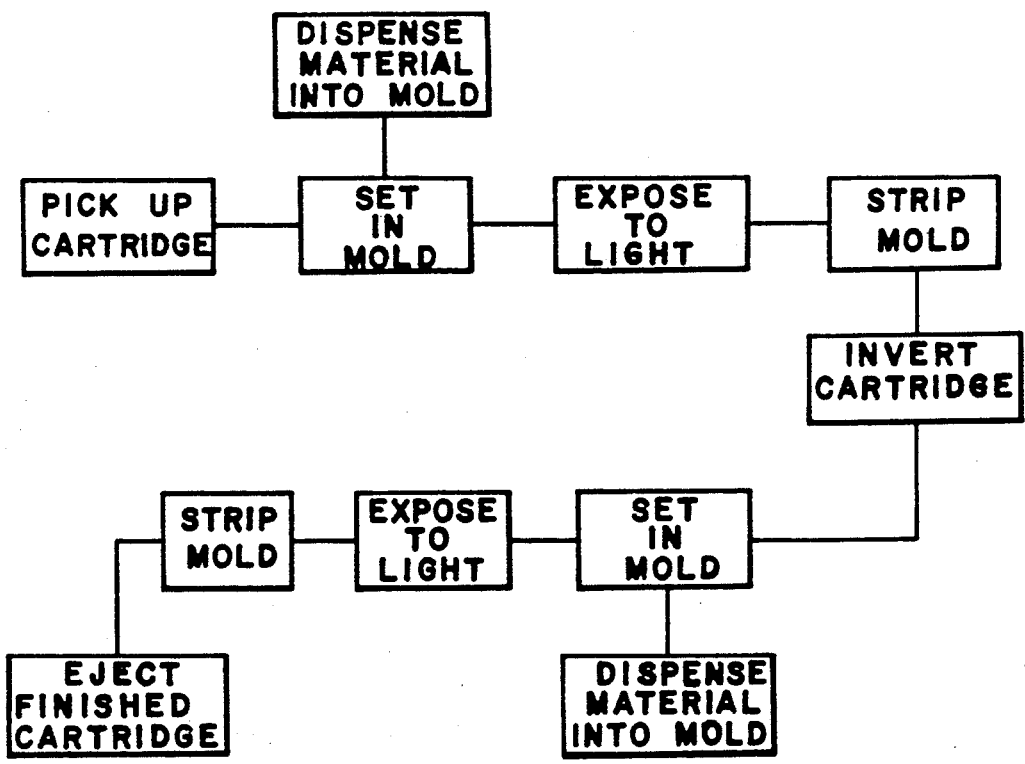
FIG. 5 is a block diagram illustrating the method in which the end caps are installed on the filter array illustrated in FIGS. 1 and 2.
Figure 7:
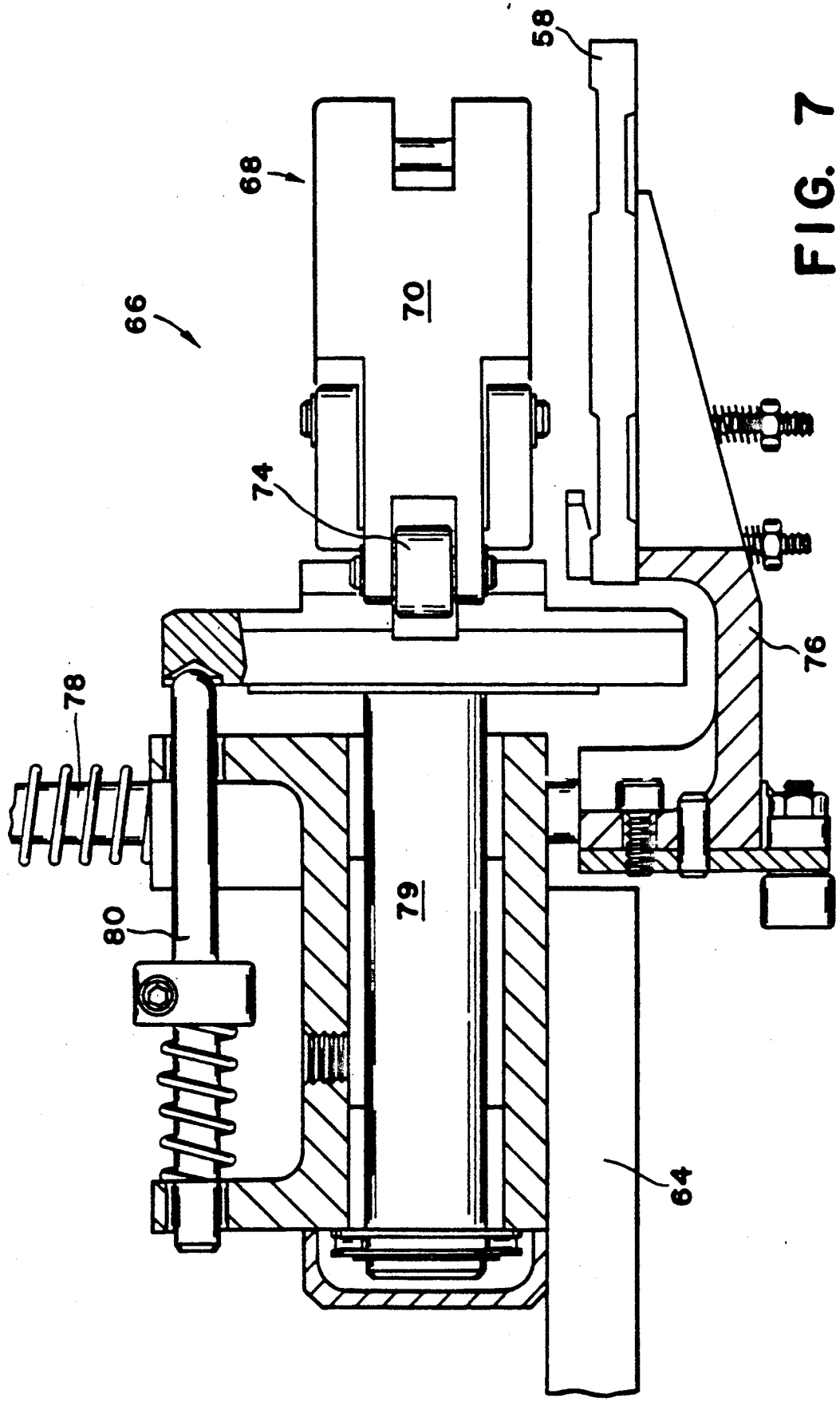
FIG. 7 is a view, partly in section, of the grasping fixture used in the dial machine illustrated in FIG. 6.
Figure 6:
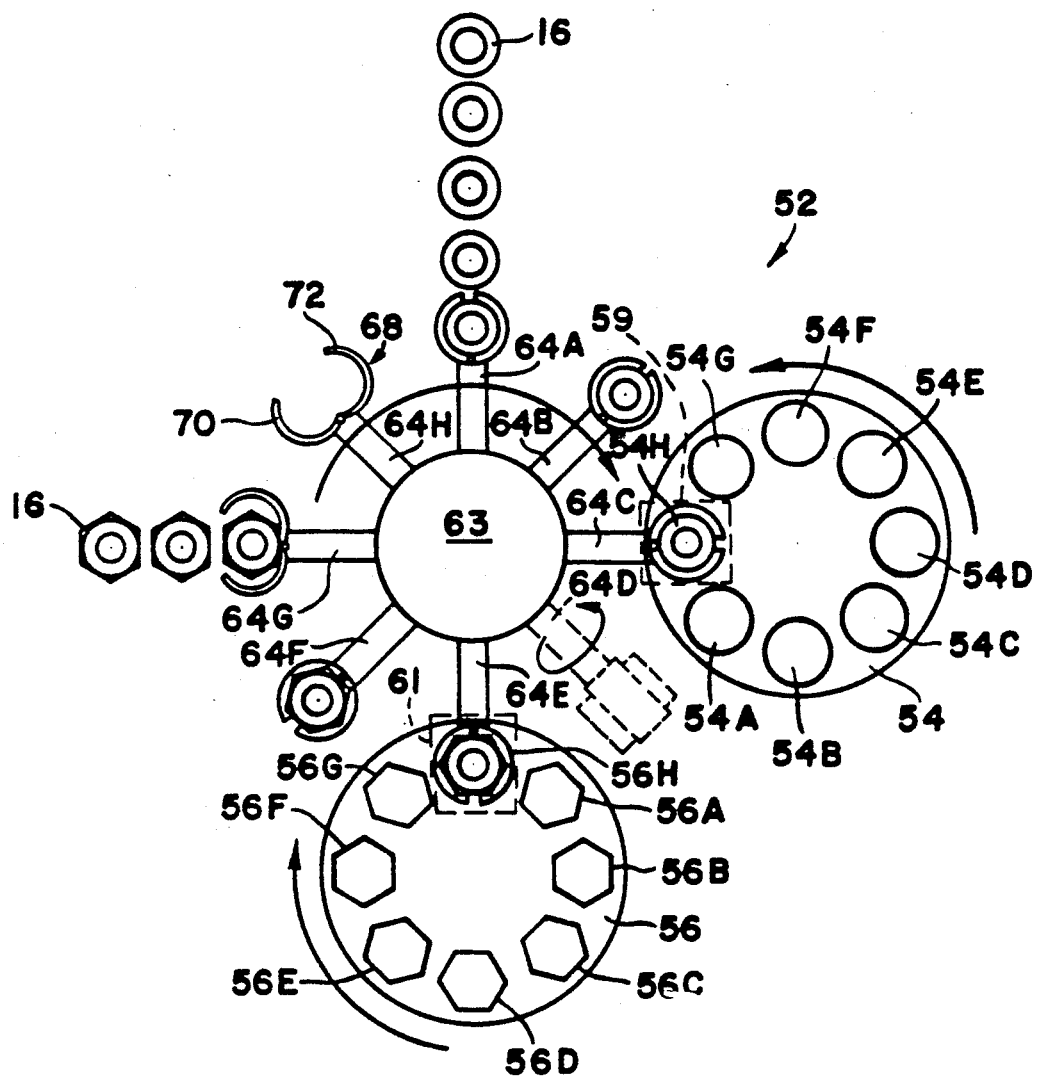
FIG. 6 is a diagrammatic illustration of the dial machines used in the process illustrated diagrammatically in FIG. 5.

Referring to FIGS. 5 and 6, the cartridge 16 is picked up by the fixture carried on the arm disposed in the position illustrated at 64A in FIG. 6. The cartridge is then transferred through idle station 64B into the station illustrated at 64C in FIG. 6. The photo-initiated polymer is dispensed into the mold 58 when the mold is disposed in the position marked 54A in FIG. 6. The rest of the positions between 54A and station 54H are idle stations, where the necessary inspections, etc. may be performed.

When the cartridge 16 is disposed over station 54H on dial 54 in the position illustrated as the position of arm 64C on dial 63, the mold supporting arm 76 picks up the mold disposed in the station 54H, and raises the mold into engagement with the lower end of the cartridge 16 which is being gripped by the grippers 68. The ultraviolet light source is then actuated to cure the polymer. When this occurs, the cartridge 16, with the mold 58 in place on the arm 76 is indexed toward the position illustrated in the dashed lines as 64D in FIG. 6. As the dial 63 is indexed toward the 64D position, the arm 76 is lowered to strip the mold 58 from the cartridge. When the cartridge reaches the 64D position, the grippers 68 are caused to rotate about the axis 80 by 180°, to thereby invert the cartridge, so that the end cap that has just been installed on the cartridge is on top, and the unfinished end of the cartridge is on the bottom. The dial 63 then indexes to the position illustrated at 64E in FIG. 6. The mold which was carried from the dial 54 is then kicked off into station 56H. Dial 56 is then indexed one station, moving the mold that has just been transferred from dial 54 into the station 56A.

Station 56A is a dispensing station, where the polymer is dispensed into the mold. The remaining stations 56B-56G are idle stations where the necessary inspections, etc., can take place. As the mold that has just been transferred from the dial 54 is indexed to station 56A, the mold in station 56G, which has the opposite surface 60 or 62 facing upward as compared to the mold that was just transferred from dial 54, is indexed into station 56H. Since this mold has already had polymer dispensed into it at station 56A, the mold is then picked up on the mold arm 76, brought into engagement with the end of the cartridge 16, cured by actuating the ultraviolet light 61, and then, as the dial is indexed towards the station 64, the mold is stripped from the filter cartridge. Station 64F is an idle station, and the dial 63 is rotated from this station to the station 64G, where the clamshell gripper 68 is released to release the filter cartridge 16 with the end caps applied. 64H is also an idle station.

It will be noted that the mold which is picked up off the dial 56 remains on the table 76 as the dial 63 is indexed through position 64F, 64G, 64H, 64A, and 64B. This mold is redeposited on the dial 54 at station 54H, before the dial 54 is indexed to bring the dial in position 54G into the 54H position. As described hereinabove, the mold is then raised into position against the end of the new cartridge which has just been picked up at station 64A and the entire process repeats. Accordingly, molds are transferred from station 54H of dial 54 to station 56H of the dial 56. The dial 56 is rotated, a new mold is transferred into station 56H, which is picked up by the fixture, and then rotated through the other stations and deposited back on dial 54. Accordingly, molds are continuously interchanged between the dials 54, 56.

Although the specific embodiment disclosed relates to a filter for filtering the lubricating oil of an internal combustion engine, the concept disclosed may also be applied to filters for filtering other liquids (such as gasoline) or gasses (such as the combustion air used by an internal combustion engine) or for filters used for applications other than internal combustion engines.

What is claimed is:

1. A filter comprising a circumferentially extending array of radially tapering pleats defining a filtering media, said array being formed into a cylinder, said cylinder having a pair of opposite ends defined by the ends of said pleats, and a pair of circumferentially extending sealing end caps extending circumferentially around the ends of said cylinder to seal the ends of said pleats, characterized in that the material comprising at least one of said end caps is a photo-initiated polymer, said pleats extending between inner tips and outer tips, said inner tips cooperating to define an inner circumference of said array, a supporting perforated centertube circumscribing the inner circumference of said array to support the inner tips of said pleats, and a housing receiving the array with said centertube, said housing including a circumferentially extending wall circumscribing the outer tips of said pleats, said end caps including portions of greater and lesser thickness, said portions of greater thickness including reinforcing ribs extending across the ends of at least some of said pleats to increase the hoop strength of the corresponding end cap, said centertube including upper and lower ends coplanar with the upper and lower ends of said cylinder, at least one of the end caps including a portion of greater thickness defining a circumferentially extending reinforcing rib circumscribing a corresponding end of the centertube and extending radially from said corresponding end of the centertube to cover the portions of the corresponding end of said pleats adjacent to the end of the centertube.

2. A filter as claimed in claim 1, wherein at least one of said end caps includes tabs integral with the corresponding end cap and of the same photo-initiated polymer of which the end caps are made, said tabs being spaced circumferentially around said array and projecting beyond the circumference defined by the outer tips of said array to engage the circumferentially extending wall of said housing to center the array within said housing.

3. A filter as claimed in claim 2, wherein said circumferentially extending wall of said housing defines an end closed by an end wall of said housing, said one end of said centertube being closed by a centertube cap, spring means extending across the corresponding end cap from said centertube cap to said end wall to yieldably urge the array and the centertube toward the end of the housing opposite said end wall, said centertube including circumferentially spaced, radially inwardly extending projections for engaging the centertube cap to permit the spring means to urge the centertube cap against the projections to thereby relieve the end cap of the load exerted by the spring means.

4. A filter comprising a circumferentially extending array of radially tapering pleats defining a filtering media, said array being formed into a cylinder, said cylinder having a pair of opposite ends defined by the ends of said pleats, and a pair of circumferentially extending sealing end caps extending circumferentially around the ends of said cylinder to seal the ends of said pleats, characterized in that the material comprising at least one of said end caps is a photo-initiated polymer, said pleats extending between inner tips and outer tips, said inner tips cooperating to define an inner circumference of said array, a supporting perforated centertube circumscribing the inner circumference of said array to support the inner tips of said pleats, and a housing receiving the array with said centertube, said housing including a circumferentially extending wall circumscribing the outer tips of said pleats, said circumferentially extending wall of said housing defining an end closed by an end wall of said housing, said one end of said centertube being closed by a centertube cap, spring means extending across the corresponding end cap from said centertube cap to said end wall to yieldably urge the array and the centertube toward the end of the housing opposite said end wall, said centertube including circumferentially spaced, radially inwardly extending projections for engaging the centertube cap to permit the spring means to urge the centertube cap against the projections to thereby relieve the end cap of the load exerted by the spring means.

5. A filter comprising a circumferentially extending array of radially tapering pleats defining a filtering media, said array being formed into a cylinder, said cylinder having a pair of opposite ends defined by the ends of said pleats, and a pair of circumferentially extending sealing end caps extending circumferentially around the ends of said cylinder to seal the ends of said pleats, characterized in that the material comprising at least one of said end caps is a photo-initiated polymer, said pleats extending between inner tips and outer tips, said inner tips cooperating to define an inner circumference of said array, a supporting perforated centertube circumscribing the inner circumference of said array to support the inner tips of said pleats, and a housing receiving the array with said centertube, said housing including a circumferentially extending wall circumscribing the outer tips of said pleats, at least one of said end caps including tabs integral with the corresponding end cap and of the same photo-initiated polymer of which the end caps are made, said tabs being spaced circumferentially around said array and projecting beyond the circumference defined by the outer tips of said array to engage the circumferentially extending wall of said housing to center the array within said housing.

6. A filter comprising a circumferentially extending array of radially tapering pleats defining a filtering media, said array being formed into a cylinder, said cylinder having a pair of opposite ends defined by the ends of said pleats, and a pair of circumferentially extending sealing end caps extending circumferentially around the ends of said cylinder to seal the ends of said pleats, said pleats extending between inner tips and outer tips, said inner tips cooperating to define an inner circumference of said array, a supporting perforated centertube circumscribing the inner circumference of said array to support the inner tips of said pleats, and a housing receiving the array with said centertube, said housing including a circumferentially extending wall circumscribing the outer tips of said pleats, characterized in that the material comprising at least one of said end caps is a photo-initiated polymer which is cured by ultraviolet light without adding heat to said polymer, said polymer consisting of solids so that no vapors are driven off during the curing process.

7. Method of manufacturing a filter comprising the steps of forming a filtering media into a cylindrical array of radially tapering pleats having a pair of opposite ends defined by the end of said pleats, providing a mold made from transparent material contoured to the desired shape of a circumferentially extending end cap for sealing the ends of said pleats defining one end of the array, dispensing a photo-initiated polymer in said mold, placing said one end of the array in the photo-initiated polymer in the mold by using a fixture capable of grasping and releasing the array to grasp the array, positioning said one end of the array over the mold, and moving the array and/or the mold relative to one another to engage the array with the mold, exposing the polymer to a light source by directing light through the transparent mold for a period of time sufficient to cure the polymer, and stripping the array with the end cap attached thereto from the mold.

8. Method of manufacturing a filter as claimed in claim 7, wherein the light source is a source of ultraviolet light.

9. Method of manufacturing a filter as claimed in claim 7, wherein the array is stripped from the mold by allowing the mold to drop away from the array while causing the fixture to maintain its grasp on the array.

10. Method of manufacturing a filter as claimed in claim 9, including the steps of dispensing a photo-initiated polymer into another mold contoured to the desired shape of a circumferentially extending end cap for sealing the ends of said pleats defining the other end of the array, placing said other end of the array in the photo-initiated polymer in the another mold, exposing the polymer to a light source for a period of time sufficient to cure the polymer, and stripping the array with the end cap attached thereto from the mold.

11. Method of manufacturing a filter as claimed in claim 10, wherein said other end of the array is placed in the another mold by rotating said fixture after the one mold is stripped from the one end of the array, positioning the array while continuing to be grasped by said fixture over said another mold, and moving the array and/or the another mold relative to one another to engage the array with the another mold.

12. Method of manufacturing a filter as claimed in claim 11, including the steps of stripping the another mold from the other end of the array, releasing the array from the fixture, and conveying the filter away from the fixture.

13. Method of manufacturing a filter as claimed in claim 12, wherein the another mold is stripped from the array by allowing the mold to drop away from the array while the fixture maintains its grasp on the array.

14. Method of manufacturing a filter as claimed in claim 13, wherein the another mold is carried with said array on said fixture after the other end of the array is engaged with the polymer in the another mold until the array is released, said method including the steps of carrying the another mold with the fixture after the array is released, grasping a new array, dispensing a photo initiated polymer in a third mold, and releasing the another mold before the one end of the new array is engaged with the polymer dispensed in the third mold.

15. Method of manufacturing a filter as claimed in claim 10, including the step of carrying the one mold with the fixture after the one mold is stripped from the array, and releasing the one mold from the fixture before the other end of the array is positioned over the another mold.

* * * * *